(No Model.)
B. F. CORNISH.
HARNESS SADDLE AND TRIMMINGS.
No. 290,402. Patented Dec. 18, 1883.
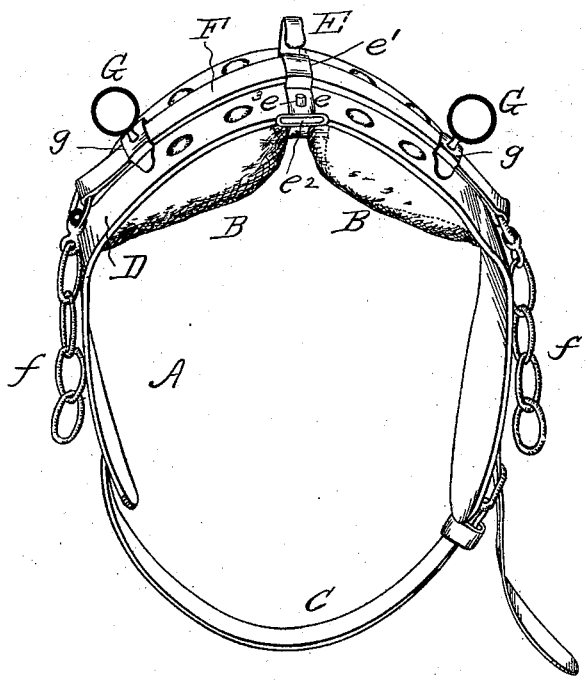
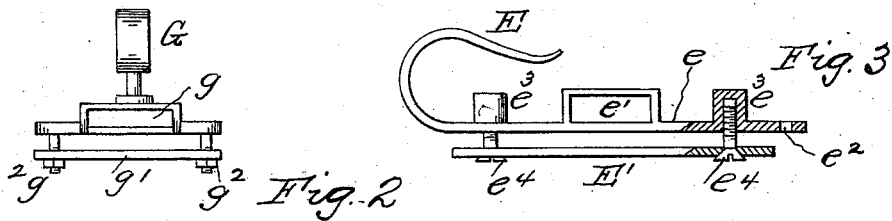
WITNESSES:
George W. Selzer
J. G. Reiff
INVENTOR
Benjamin F. Cornish
by
Allen H. C. Gangewer
ATTORNEY

UNITED STATES PATENT OFFICE.

BENJAMIN F. CORNISH, OF PHILADELPHIA, PENNSYLVANIA.

HARNESS-SADDLE AND TRIMMINGS.

SPECIFICATION forming part of Letters Patent No. 290,402, dated December 18, 1883.

Application filed February 2, 1883. (No model.)

*To all whom it may concern:*

Be it known that I, BENJAMIN F. CORNISH, of Philadelphia, in the county of Philadelphia and State of Pennsylvania, have invented a new and valuable Improvement in Saddles and Hooks; and I do hereby declare that the following is a full, clear, and exact description of the construction and operation of the same, reference being had to the annexed drawings, making a part of this specification, and to the letters and figures of reference marked thereon.

Figure 1 of the drawings is a perspective view of my improved saddle and hook. Figs. 2 and 3 are detail elevations, the latter being partly sectional.

My invention has relation to harness-saddles, and has for its object to provide an inexpensive and durable saddle, which is easily constructed, and which will not chafe the horse's back when lateral pressure is applied to the shafts.

My invention accordingly consists in the novel combination, construction, and arrangement of the saddle and its parts, as hereinafter specifically described and claimed, having reference particularly to a check-rein hook and crupper-strap loop made in one piece, and to the terrets, the latter and the former being provided with loops for the passage of the back-strap, whereby the latter is placed in position upon the saddle, so as to be capable of sliding or moving thereon.

Referring to the accompanying drawings, A represents a saddle composed of pads B B, belly-band C, and housing D, connected together in the usual or other suitable manner.

E represents the check-rein hook, having an elongated shank, $e'$, for the passage of the back-strap F, crupper-loop $e^2$, and studs $e^3 e^3$, internally threaded for the screws $e^4 e^4$, which also pass through a plate, E', as more plainly shown in Fig. 3, by means of which said hook and its component parts are secured to the housing D when in position thereon, as illustrated in Fig. 1. The plate E' is beneath the housing and concealed from view.

G represents the terrets for the reins, having loop $g$, plate $g'$, and screws, or screws and nuts, or rivets $g^2$, for securing them to the housing in a manner as above described for the check-rein hook. The back-strap F passes loosely through the loops $e' g g$, and is provided with suitable shaft tugs or chains, $f f$. Said back-strap is not therefore fixedly attached to the saddle. Consequently when lateral pressure is applied to the shafts it slides in said loops without moving the pads or the saddle, and all chafing or rubbing of the horse's back is avoided.

The check-rein hook and crupper-strap loop being in one piece or integral with each other, they are not liable to be separately torn from the saddle, as has heretofore been the case when made and connected to the saddle independently of one another.

I have shown the check-rein hook formed with studs $e^3$ and screws $e^4$; but said studs may be dispensed with and the screws or rivets formed integral therewith, as shown in Fig. 2, for the terrets G. So, too, in some circumstances said plates and screws may be dispensed with and the hook and terrets riveted to the housing.

What I claim is—

1. A harness-saddle having terrets G, with loops $g$, plates $g'$, and fastening mechanism therefor, substantially as shown and described.

2. A harness-saddle having terrets G, with loops $g$, holding-plates $g'$, and the check-rein hook E, having loop $e'$, holding-plates E', and fastening devices for both said plates, substantially as shown and described.

3. The check-rein hook E, having shank $e$, loop $e'$, and crupper-strap loop $e^2$, formed integral with each other, in combination with a plate, E', and screw or rivet connections, substantially as and for the purpose set forth.

4. The terret G, having loop $g$, in combination with plate $g'$ and screw or rivet connections $g^2$, substantially as shown, and for the purpose set forth.

In testimony that I claim the above I have hereunto subscribed my name in the presence of two witnesses.

BENJAMIN F. CORNISH.

Witnesses:
GEORGE W. SELTZER,
ALLEN H. GANGEWER.